US006517661B2

(12) United States Patent
Hill, IV et al.

(10) Patent No.: US 6,517,661 B2
(45) Date of Patent: Feb. 11, 2003

(54) LABELING METHOD EMPLOYING RADIATION CURABLE ADHESIVE

(75) Inventors: William J. Hill, IV, Landenberg, PA (US); Thomas C. McNutt, Newark, DE (US); Bryan Bellafore, Newark, DE (US); Paul D. Fussey, West Chester, PA (US); Kenneth J. Longmoore, Newark, DE (US)

(73) Assignee: Applied Extrusion Technologies, Inc., New Castle, DE (US)

( * ) Notice: Subject to any disclaimer, the term of this patent is extended or adjusted under 35 U.S.C. 154(b) by 0 days.

(21) Appl. No.: 09/875,222

(22) Filed: Jun. 6, 2001

(65) Prior Publication Data

US 2002/0000293 A1 Jan. 3, 2002

Related U.S. Application Data

(63) Continuation-in-part of application No. 09/704,491, filed on Nov. 2, 2000, which is a continuation-in-part of application No. 09/588,333, filed on Jun. 6, 2000.

(51) Int. Cl.[7] .................................................. B32B 31/28

(52) U.S. Cl. ................................ 156/273.3; 156/275.5; 156/275.7; 156/DIG. 28

(58) Field of Search .............................. 156/256, 272.2, 156/273.3, 275.5, 275.7, DIG. 28, DIG. 29, DIG. 34, DIG. 36

(56) References Cited

U.S. PATENT DOCUMENTS 2,725,156 A 11/1955 Manas
2,830,724 A 4/1958 Manas
2,860,804 A 11/1958 Sherrington
3,116,193 A 12/1963 Ehlenbeck
3,658,630 A 4/1972 Stauber
3,823,050 A 7/1974 La Mers
3,904,466 A 9/1975 Jones et al.
3,938,698 A 2/1976 McDavid, Jr. et al.
3,953,278 A 4/1976 Smith et al.
3,982,185 A 9/1976 Shinn et al.
4,072,552 A 2/1978 Ewing (List continued on next page.)

FOREIGN PATENT DOCUMENTS

| | | |
|---|---|---|
| DE | 197 49 632 C1 | 3/1999 |
| GB | 2 321 044 A | 7/1998 |
| WO | WO 97/35290 | 9/1997 |
| WO | WO 99/55517 | 11/1999 |

*Primary Examiner*—Michael W. Ball
*Assistant Examiner*—John T. Haran
(74) *Attorney, Agent, or Firm*—Caesar, Rivise, Bernstein, Cohen & Pokotilow, Ltd.

(57) ABSTRACT

This invention relates to a labeling system for continuously applying a layer of a radiation curable adhesive, e.g., a UV curable adhesive, to plastic, sheet fed, cut and stack, labels, irradiating the adhesive on the labels to render the adhesive sufficiently tacky to effectively adhere the labels to containers in a commercial labeling machine and thereafter applying the labels to discrete containers through the sufficiently tacky adhesive layer. The plastic labels can be clear, opaque (including metallized) plastic films and can be retained in a dispensing magazine prior to the application of the radiation curable adhesive to the labels.

39 Claims, 3 Drawing Sheets

U.S. PATENT DOCUMENTS

| | | | |
|---|---|---|---|
| 4,123,310 A | | 10/1978 | Varon et al. |
| 4,181,752 A | | 1/1980 | Martens et al. |
| 4,272,311 A | | 6/1981 | D'Angelo et al. |
| 4,279,687 A | | 7/1981 | Buchholz et al. |
| 4,547,250 A | | 10/1985 | Murayama |
| 4,861,621 A | | 8/1989 | Kanzaki |
| 4,946,531 A | | 8/1990 | Crouch et al. |
| 4,977,006 A | | 12/1990 | Smith et al. |
| 5,028,290 A | | 7/1991 | Cruiel |
| 5,152,858 A | | 10/1992 | Winter |
| 5,174,852 A | | 12/1992 | Zepf |
| 5,215,622 A | | 6/1993 | Schmelzer |
| 5,234,730 A | | 8/1993 | Lautenschlaeger et al. |
| 5,290,388 A | | 3/1994 | Zepf |
| 5,427,642 A | | 6/1995 | Akiguchi et al. |
| 5,458,729 A | | 10/1995 | Galchefski et al. |
| 5,464,495 A | | 11/1995 | Eder |
| 5,466,325 A | | 11/1995 | Mizuno et al. |
| 5,518,569 A | | 5/1996 | Achilles et al. |
| 5,658,631 A | | 8/1997 | Bernstein et al. |
| 5,705,024 A | | 1/1998 | Bainbridge et al. |
| 5,714,269 A | | 2/1998 | Munoz Madrid |
| 5,785,803 A | | 7/1998 | Schiessl |
| 5,843,598 A | | 12/1998 | Ueda et al. |
| 5,885,401 A | | 3/1999 | Eiban |
| 5,893,958 A | | 4/1999 | Cummings et al. |
| 5,897,722 A | | 4/1999 | Bright |
| 5,992,314 A | | 11/1999 | Lorenz et al. |
| 6,007,658 A | | 12/1999 | Calvert |
| 6,009,926 A | | 1/2000 | Vicktorius et al. |
| 6,013,693 A | | 1/2000 | Takahashi et al. |
| 6,024,830 A | | 2/2000 | Nedblake et al. |
| 6,242,504 B1 | * | 6/2001 | Meyer-Roscher et al. .................... 156/272.2 |

* cited by examiner

FIG. 2
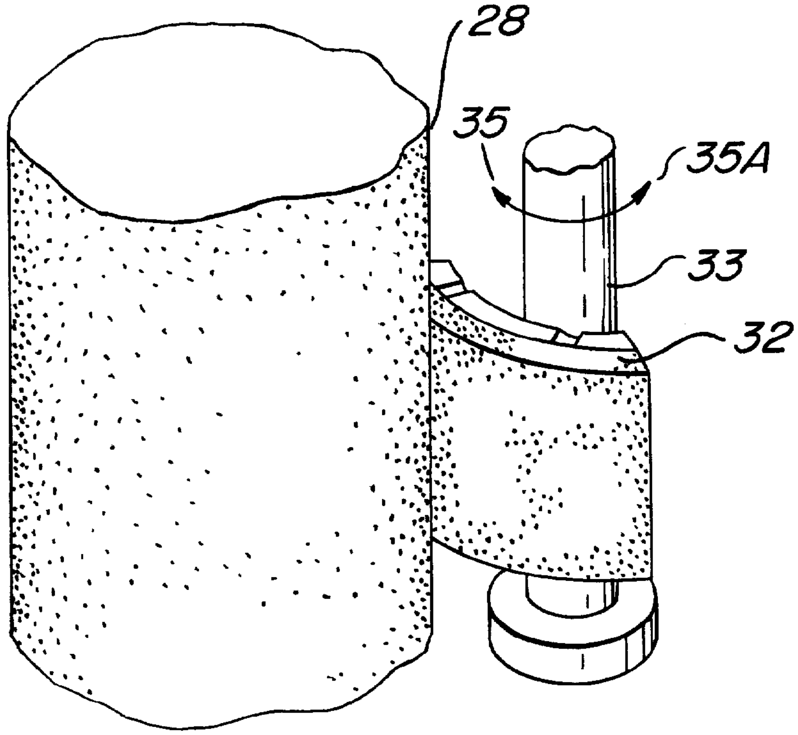
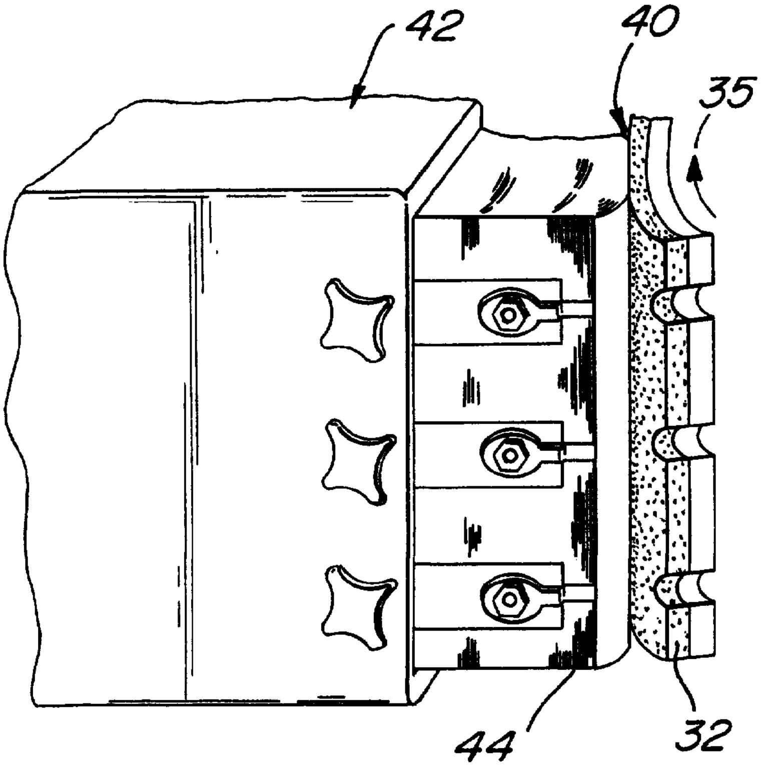
FIG. 3

LABELING METHOD EMPLOYING RADIATION CURABLE ADHESIVE

RELATED APPLICATIONS

This application is a continuation-in-part of application Ser. No. 09/704,491, filed Nov. 2, 2000, titled Labeling Apparatus and Method Employing Radiation Curable Adhesive, which in turn is a continuation-in-part of application Ser. No. 09/588,333, filed Jun. 6, 2000, and titled Ultraviolet Labeling Apparatus and Method. The subject matter of both the '491 and '333 applications are hereby fully incorporated by reference herein.

FIELD OF THE INVENTION

This invention relates generally to a labeling apparatus and method for applying labels to containers, and more particularly to a labeling apparatus and method employing a radiation curable adhesive for adhering a label to a container. The labels employable in this invention are in the form of plastic, sheet fed/cut and stack labels, and can be formed of films that are transparent or opaque (including metallized films). Most preferably the radiation curable adhesive is a UV curable adhesive.

BACKGROUND ART

A number of prior art systems exist for applying labels to containers. These systems employ either continuous roll fed labels or cut and stack labels.

Prior art labeling apparatus and methods employing labels in continuous roll form include label cutting and registration means for severing discrete labels from the roll and then registering them for attachment to the containers through a vacuum transfer drive system. In these prior art systems a hot melt adhesive generally is employed; being applied to both the leading and trailing edge of the back side of the labels for permitting attachment of the labels to the containers.

Although the above-described system is being commercially utilized, it does include a number of drawbacks for various applications. First, continuous roll fed labeling systems require both label cutting and registration units, which increase the complexity of the system. Second, hot melt adhesives are, at best, generally cloudy or milky in appearance and therefore are not effectively utilized to apply clear or transparent labels in a uniform fashion to clear containers. The uniform attachment of clear or transparent labels to clear containers, e.g., clear glass or plastic beer and soda bottles, is very desirable, providing a very clean finish, and also permitting the product inside of the bottle to be clearly and easily viewed through the label. A further deficiency in connection with the use of hot melt adhesives is that they generally are difficult to apply as a smooth, continuous layer to the label stock.

It is known to employ continuous rolls of transparent pressure sensitive labels for application to clear containers. However, as discussed above, the use of these continuous rolls require cutting and registration units that increase the complexity of the system. Moreover, the rolls of pressure sensitive labels often include a release liner covering the adhesive surface, thereby necessitating the removal of the release liner from the label during the continuous process. This also introduces an undesired complexity and cost into the system.

It also is known to apply sheet fed/cut and stack labels (i.e., labels that have been cut off line and are retained in a stack within a dispensing magazine) to containers, such as bottles, in a continuous label application system. These latter prior art systems often employ a cold glue adhesive, which is water soluble, and sometimes employ a hot melt adhesive. When a cold glue adhesive is employed it is applied to a glue transfer pad by a transfer roll that commonly is made of steel, and then the glue transfer pad is moved into contact with the lower label of the stack to both apply the glue to that label and remove the label from the stack through surface adhesion between the label and the adhesive. Thereafter, the label, with the cold glue adhesive thereon, is moved to a transfer drum, from where it is then applied to a container, such as a glass bottle. These cold glue adhesives generally have been utilized only in connection with paper labels that are capable of absorbing the moisture from the water soluble adhesives. In other words, systems employing water soluble cold glue adhesives are not well suited for use with non-porous, plastic labels. Although hot melt adhesives also have been employed with cut and stack labels, they are subject to the same deficiencies discussed above with respect to the use of such adhesives on continuous label stock.

Based on the deficiencies of the existing prior art systems, a need exists for a labeling apparatus and method that is not required to handle an excessively tacky adhesive throughout the label handling and applying operations, and that is effective for use with plastic labels for adhering such labels to containers. Although the desired systems of this invention are usable with both opaque and clear plastic labels to adhere such plastic labels to both opaque and clear containers, the most significant need exists in providing a system for adhering clear plastic labels to clear containers, such as clear glass bottles, e.g., beer or soda bottles, without the presence of unsightly striations or other unsightly imperfections in the adhesive distribution.

Most preferably a need exists for the aforementioned type of system that does not require the use of label cutting and registration units of the type generally employed in labeling apparatus and methods that handle continuous roll fed labels.

OBJECTS OF THIS INVENTION

It is a general object of this invention to provide a method and apparatus for applying plastic labels to containers that are reliable in operation.

It is a further object of this invention to provide a method and apparatus for applying plastic labels devoid of any release liner to containers in a reliable manner.

It is a further object of the most preferred embodiment of this invention to provide a method and apparatus for applying transparent plastic labels to clear containers in a reliable manner.

It is a more specific object of this invention to provide a method and apparatus for applying transparent plastic labels to clear containers without unsightly striations or other unsightly imperfections in the adhesive.

It is a further object of the most preferred embodiment of this invention to provide a sheet fed, cut and stack, labeling method and apparatus for applying plastic labels to containers that do not require the use of label cutting and registration devices of the type included in labeling systems that handle labels in continuous roll form.

It is still a further object of this invention to provide a method and apparatus for applying a plastic label to a container wherein an excessively tacky adhesive is not required to be handled throughout the entire label forming and applying operations.

It is yet a further object of this invention to provide a method and apparatus for applying a plastic label to a container wherein an adhesive is rendered sufficiently tacky to effectively adhere it to the container just prior to applying the label to the container; the result being equivalent to utilizing a conventional pressure-sensitive label but without the attendant drawbacks thereof, as discussed earlier.

SUMMARY OF THE INVENTION

The above and other objects of this invention are achieved in a labeling apparatus and method wherein a radiation curable adhesive, which is not excessively tacky prior to curing (or partial curing), is applied to the surface of a label to be attached to a bottle, and the label, with the radiation curable adhesive thereon, is then sequentially fed through a curing operation to render the adhesive sufficiently tacky to adhere the label to a container, and then to a station for immediately applying the label to a surface of the container through the tacky adhesive on the label.

It is within the scope of this invention to cure the adhesive to a full pressure sensitive state in the curing operation. In this condition, additional curing of the adhesive after the label is applied to the container is not required to take place, and in fact, does not take place; the adhesive being sufficiently tacky to assure that the label remains permanently adhered to the container during normal handling of the container. It also is within the scope of this invention to only partially cure the adhesive in the radiation curing step to render the adhesive sufficiently tacky to initially adhere the label to a container. However, thereafter the adhesive will continue to cure, or set-up, to assure that the label remains permanently adhered to the container during normal handling of the container.

In accordance with the most preferred embodiment of this invention, the radiation curable adhesive is curable with ultraviolet radiation, although it is within the scope of the broadest aspects of this invention to employ other types of radiation curable adhesives, such as adhesives curable by radio frequency radiation and electron beam radiation. The most preferred adhesives useable in this invention should have a sufficiently low viscosity to permit them to be applied by an adhesive applicator roll to outer surfaces of transfer pads on a rotating support member for subsequent application from the transfer pads substantially continuously and uniformly to the surface of a label to be adhered to a container. When the label is a cut and stack label, the adhesive also needs to have a sufficient initial tack (hereinafter sometimes referred to as "minimal tack") to permit the transfer pads, with the adhesive on the surface thereof, to remove the lowermost label from a stack of such labels retained within a magazine at the time that the adhesive also is being applied to that label by a transfer pad. This initial, or minimal tack cannot be so strong as to preclude peeling the label from the transfer pad at a subsequent station at which the adhesive on the label is at least partially cured, in a manner to be further explained hereinafter.

In the most preferred embodiments of this invention, particularly when the labels are transparent and are adhered to clear containers, the adhesive is a UV curable adhesive that has the ability to cold flow after application of the label to the bottle to eliminate, or at least minimize the existence of unsightly adhesive striations between the label and container.

Most preferably, when transparent labels are being utilized in the method and apparatus of this invention, the UV curable adhesive is applied with a coat weight of at least 6 pounds per ream and more preferably in the weight range 7 to 8 pounds per ream, or even greater. Preferably this adhesive is applied to the label at a sufficient thickness to enable the adhesive to cold flow after the label is applied to the bottle, and thereby fill in unsightly striations that often are formed in the adhesive between the label and the bottle. An adhesive thickness in the range of about 1 to about 1.5 mils has been determined to cold flow after application of the label to the container, to fill in unsightly striations and other visual defects in the adhesive layer.

In accordance with the most preferred embodiment of this invention, the labels are individual, cut and stack labels retained in a magazine, and a UV curable adhesive is applied to a lower surface of each label in the stack through a rotating transfer pad that moves sequentially through an adhesive application station in which a measured quantity of UV curable adhesive is transferred to the exposed surface of the pad, and then to a transfer station wherein the adhesive on the exposed surface of the pad engages the lowermost label in the stack to both apply the adhesive to that label and remove the label from the stack through the surface adhesion created between the label surface and the "minimal tack" of the uncured UV curable adhesive. Reference throughout this application to the adhesive having "minimal tack" or being "minimally tacky" refers to a tacky condition that is sufficient to engage and remove the lowermost label from a stack of cut and stack labels retained in a magazine, but which is not so strong as to either preclude peeling of the label off of the transfer pad at a subsequent cure station, or to permit the uncured adhesive to consistently, reliably and effectively adhere the label to a container in a commercial labeling system and method. Reference in this application to a label being "effectively adhered" to a container, or to the "effective adherence" of a label to a container, or words of similar import, means that the label is required to be secured to the container in a manner that precludes the edge regions or body thereof from unacceptably separating from the container wall during handling and use of the container, and most preferably, although not required within the broadest scope of this invention, in a manner that prevents an individual from easily peeling the label off of the container.

Therefore, in order to produce commercially acceptable, labeled containers in accordance with this invention the radiation curable adhesive must be at least partially cured prior to the label being applied to the container to assure that the adhesive is rendered sufficiently tacky to achieve the desired effective adherence of the label on the container. In accordance with the preferred embodiment of this invention, the UV curable adhesive may be only partially cured at the time that the label is applied to the container and then, in a relatively short time, become more completely cured to provide effective adherence of the label on the container.

In the most preferred embodiment of this invention the UV curable adhesive is comprised of free radical and/or cationic initiators and monomers that are polymerizable by these mechanisms; and is capable of flowing while curing on a container to fill in imperfections, e.g., striations, in the initial distribution of the adhesive on the label.

In the most preferred embodiment of this invention, the individual labels carried on the transfer pads are then directed to a transfer assembly, wherein the individual labels, with the minimally tacky, UV curable adhesive applied thereto, are released from the pads and directed by the transfer assembly through a UV cure station in which the UV curable adhesive is rendered sufficiently tacky to permit the label to be reliably and effectively adhered to a surface of a container, and then into a label application station for transferring each individual label, with the sufficiently tacky adhesive thereon, to the outer surface of a container, preferably a glass container, such as a beer or soda bottle, to thereby effectively adhere the label to the container.

BRIEF DESCRIPTION OF THE DRAWING

Other objects and many attendant features of this invention will become readily appreciated as the same becomes better understood by reference to the following detailed description when considered in connection with the accompanying drawings wherein:

FIG. 2 is an enlarged, fragmentary isometric view of a portion of the adhesive application station wherein a UV curable adhesive is transferred to the exposed surface of a rotating transfer pad, prior to the transfer pad being directed into a transfer station for receiving a label thereon;

FIG. 3 is an enlarged, fragmentary isometric view illustrating the engagement of a rotating transfer pad with UV curable adhesive thereon with the lower most label in a stack of such labels.

DESCRIPTION OF THE PREFERRED EMBODIMENT OF THE INVENTION

Figure 1:
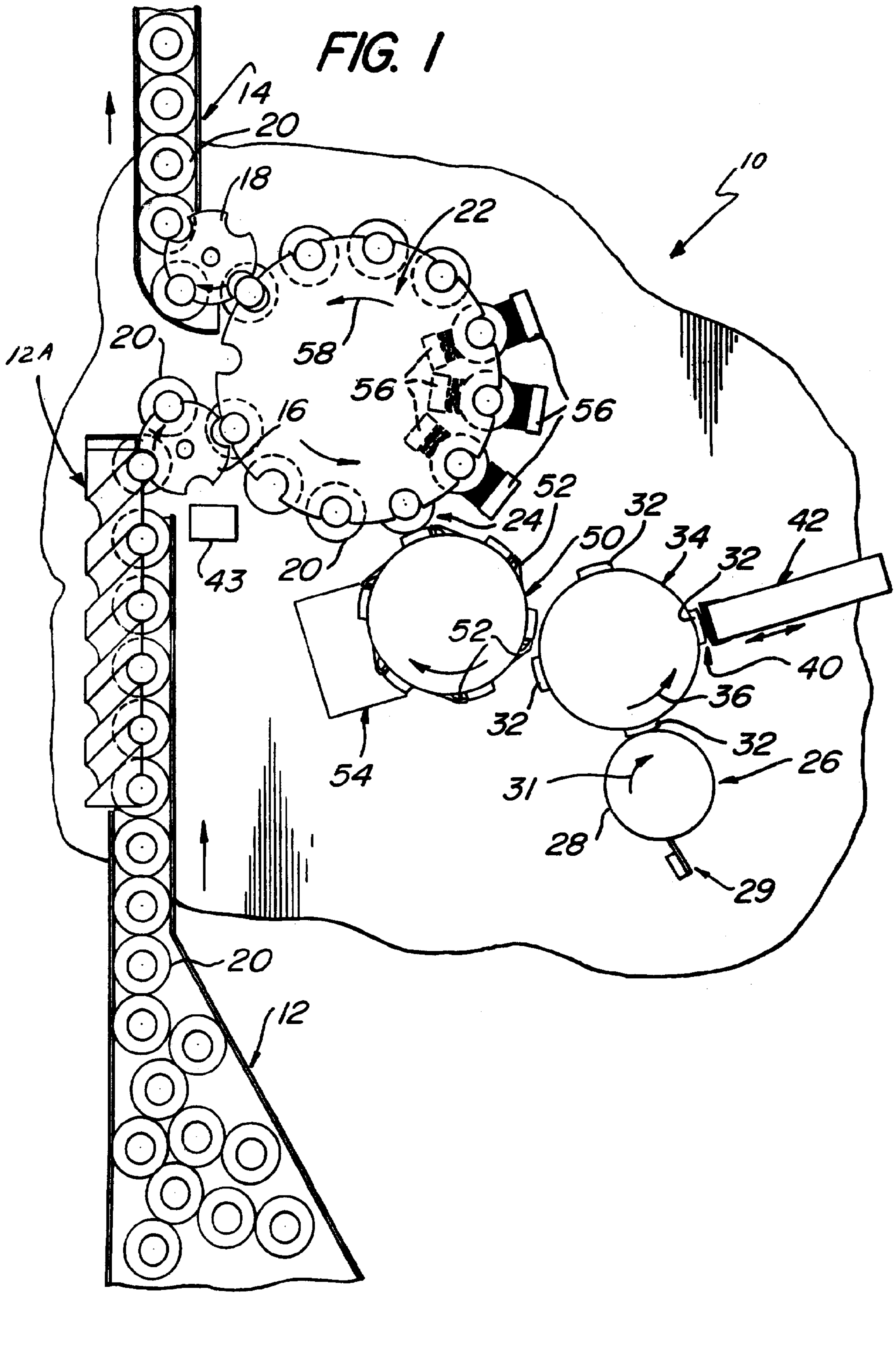
FIG. 1 is a schematic, plan view illustrating the method and apparatus of this invention.

Referring to FIG. 1, a method and apparatus for applying labels to containers in accordance with this invention are shown generally at 10. While the preferred embodiment of this invention employs an adhesive curable by radiation with ultraviolet light, i.e., a UV curable adhesive, in accordance with the broadest aspects of this invention other radiation curable adhesives may be employed, e.g., adhesives curable by radio frequency radiation or electron beam radiation. For brevity of discussion, this invention will be described in connection with the preferred embodiment employing a UV curable adhesive.

The preferred method and apparatus of this invention employs an inlet conveyor section 12, an outlet conveyor section 14 and rotating bottle-transfer members 16 and 18 for transferring bottles 20 from the inlet conveyor section to a rotating turret 22, and for removing bottles from the rotating turret to the exit conveyor section 14, respectively, after the bottles have been directed through label application station 24. However, it is within the scope of this invention to utilize an in-line system that does not require the use of a rotating turret to handle the bottles, or other containers, during the label application operation.

It should be understood that the construction of the inlet conveyor section 12, outlet conveyor section 14, rotating bottle-transfer members 16 and 18 and rotating turret 22 are all of a conventional design employed in prior art labeling apparatus and methods. For example, KRONES manufactures a line of rotary labeling equipment including an inlet conveyor section 12, an outlet conveyor section 14, rotating bottle-transfer members 16 and 18 and a rotating turret 22 of the type that can be employed in the present invention. Therefore, a detailed discussion of these features is not required herein.

Referring specifically to FIGS. 1 and 2, in the preferred method and apparatus of this invention employ an adhesive application station 26 that includes a gravure or anilox applicator roll 28 of the type that generally is used in gravure or flexographic printing systems, respectively. This roll must have a sufficient surface hardness to avoid the creation of imperfections therein, and sufficient release properties to release the adhesive carried thereby to transfer pads 32, which preferably have smooth outer surfaces, for subsequent application from those pads to a label, as will be described in greater detail hereinafter. Preferably the transfer pads include an outer, elastomeric member, e.g., rubber or photopolymer material.

The gravure or anilox applicator roll 28 preferably is employed with a doctor blade 29 of conventional design, which may be enclosed, and with adjustments to allow it to be placed in contact the surface of the gravure or anilox roll, or to be raised a desired distance away from it. In a preferred form of the invention the adhesive is circulated from an adhesive supply chamber positioned below the vertically mounted applicator roll 28 through a suitable conduit to the outer surface of the roll adjacent the upper axial end thereof. The adhesive flows down the surface of the roll 28 as the roll is being rotated in the direction of arrow 31, filling the cells therein and actually applying a coating that extends beyond the surface of the roll. Adhesive that does not adhere to the roll is collected in a base section in which the roll is mounted and flows through a return conduit to the adhesive supply chamber to be recirculated. This type of system is well known for use with cold glue adhesives and therefore no further explanation is believed to be necessary in order to enable a person skilled in the art to practice the preferred form of this invention.

It also should be noted that other systems, such as spray or slot-die application systems, can be employed to direct a controlled, metered layer of adhesive directly onto the surface of the transfer pads 32. When the adhesive is directed in a controlled, metered flow from a spray or slot-die application system, the surface of the transfer pad 32 for receiving that flow can be smooth, since that surface does not need to provide an independent metering function. However, if desired the adhesive-receiving surface of the transfer pad can include adhesive-receiving cells therein. Moreover, if the surface of each of the transfer pads for receiving adhesive does include adhesive-receiving cells therein, a smooth surfaced transfer roll possibly can be employed in place of a gravure or anilox roll, with the desired, or required, metered transfer onto the transfer pads being provided by the adhesive-receiving cells therein. Although the preferred arrangement of the applicator roll 28 is in a non-pressurized environment, it is within the broadest scope of the invention to employ a pressurized system, if desired.

Within the scope of this invention the doctor blade 29 is disposed adjacent the surface of the roll with a preferred gap of 2–4 mils, to effectively provide a coating of a controlled thickness of the adhesive layer that, subsequent to passing the doctor blade 29, is applied to the surface of transfer pads 32. The best design for the doctor blade 29 is a precision ground single blade wiper with an adjustable pitch, although other doctoring systems can be employed within the broadest aspects of this invention. In the preferred embodiment of the invention the doctor blade 29 is positioned in contact with the roll surface to essentially meter all the adhesive off the roll except for the adhesive retained within the cells in the roll surface. In a representative embodiment of the invention the roll 28 is a ceramic engraved roll having quad cells present in a concentration of 75 cells per inch. For some applications, it may be suitable to utilize, as the applicator roll 28, a plain rubber roll. Therefore, in accordance with the broadest aspects of this invention, the applicator roll need not include cells for receiving adhesive therein.

In the preferred embodiments of this invention, the surface material or coating, the cell size and concentration in the surface of the gravure or anilox roll 28 and the position of the doctor blade 29 are selected to carry a sufficient quantity of adhesive to provide the desired adhesive coat weight on the labels. When utilized to adhere clear labels to clear containers, the coat weight on the labels preferably should be at least 6 pounds per ream and more preferably in the range of 7 to 8 pounds per ream or even greater. However, the coat weight applied to the labels should not be so high as to result in excessive adhesive run-off from the transfer pads 32 to which the adhesive initially is applied. The coat weight applied to clear labels should provide a sufficient thickness to permit cold flow of the adhesive when the label is on the bottle to cause the adhesive to fill in unsightly striations or other adhesive imperfections that initially may be exist when the label is adhered to the container. In a representative embodiment of this invention the thickness of the adhesive layer on the clear label, prior to applying the label to a container, is in the range of 1 to 1.5 mils.

It should be understood that the adhesive does not need to have a thickness on the label of 1 or more mils to provide the desired degree of tack to adhere the label to the container. This thickness is desired to permit cold flow of the adhesive after the label is adhered to a container to permit the adhesive to fill in unsightly striations in the circumferential direction, or other unsightly adhesive imperfections, a feature that is particularly desirable when applying clear labels to containers.

When this invention is employed to adhere opaque labels to a container, the basis weight of the adhesive coat applied to the label can be 6.2 pounds per ream or lower, e.g., down to about 4 pounds per ream, while still achieving excellent bond strength between the label and container. Although the adhesive may not cold flow to fill in gaps in the adhesive layer, this generally will not create an unacceptable appearance in opaque labels.

Still referring to FIG. 1 the gravure or anilox applicator roll 28 is driven in the direction of arrow 31, past the doctor blade 29. Thus, the exposed outer surface of the gravure or anilox applicator roll 28 receives a metered amount of UV curable adhesive on its surface, which is then engaged by the outer-exposed surfaces of the transfer pads 32 disposed about the periphery of a rotating support member 34 that is rotated in the direction of arrow 36.

Referring specifically to FIG. 2, it should be noted that each of the transfer pads 32, the surface of which preferably is made of rubber or other suitable material, e.g., a photo polymer of the type used in a flexographic system, is mounted on the rotating support member 34 through a support shaft 33 mounted for oscillatory motion relative to the support member, as represented by the arrow heads 35 and 35A. This oscillatory motion is provided by a cam drive arrangement that is well known to those skilled in the art, and is one that actually is employed in conventional cut and stack or sheet fed labeling systems, for example manufactured by KRONES AG in West Germany or KRONES, Inc. in Franklin Wis. (Krones AG and Krones, Inc. hereinafter collectively being referred to as "KRONES").

The transfer pads 32 preferably are formed of a smooth surfaced elastomer (natural or synthetic) having a Shore A hardness in the range of about 50 to about 90. This elastomer has been determined to provide good final adhesive visual properties when employed to adhere clear labels to a bottle.

In the preferred embodiment of this invention, the transfer pads 32 are oscillated in the counterclockwise direction of arrow 35A, as viewed in FIG. 1, as each pad is moved in contact with the gravure roll 28 by rotation of the support member 34, to thereby cause the UV curable adhesive on the gravure roll to be applied substantially uniformly to each transfer pad.

Referring to FIGS. 1 and 3, the transfer pads 32, with the UV curable adhesive thereon, are then directed sequentially by the rotating member 34 to a transfer station 40. The transfer station 40 includes a magazine 42 retaining a stack of cut labels 44 therein. This magazine 42 is mounted for linear reciprocating motion toward and away from the exposed surface of the transfer pads, respectively, as is well known in the art. The linear reciprocating movement of the magazine 42 is controlled by a conventional photo detection system 43 positioned to detect the presence of a container at a specified location, preferably at the downstream end of helical feed roll 12A, of the inlet conveyor 12, as is well known in the art. If a container is detected at the specified location on the inlet conveyor 12, the magazine 42 will be moved into, or maintained in a forward position for permitting a desired transfer pad 32 to engage and remove the lowermost label from the stack of cut labels 44 retained in the magazine. The desired transfer pad 32 is the one that receives a label that ultimately will be aligned with the detected container when that container is in label applicator section 24 of the rotating turret 22, to thereby transfer, or apply, the label to the container, as will be described in detail hereinafter. If a container is not detected at the specified location by the photo detection system 43, then the magazine 42 will be retracted to preclude a predetermined transfer pad 32 from engaging and receiving the lowermost label in the magazine 44, which label ultimately would have been directed to an empty container position at the label applicator section 24 on the turret 22 resulting from a container not being in the specified location being monitored by the photo detection system.

Still referring to FIGS. 1 and 3, when a transfer pad 32 is in a position aligned for engaging the lowermost label 44 carried in the magazine 42, that pad is oscillated in the clockwise direction of arrow 35, as viewed in FIG. 1, for engaging the lowermost label 44 in the magazine 42 to both apply the adhesive to that label and remove that label from the stack through surface adhesion with the minimally tacky adhesive.

The mechanical systems employing the oscillatory transfer pad 32 and the reciprocal magazine 42 are well known in the art; being employed in commercially available cut and stack label applying systems manufactured, for example, by Krones. These mechanical systems do not form a part of the present invention. Therefore, for purposes of brevity, details of construction of these systems are omitted.

Figure 4:
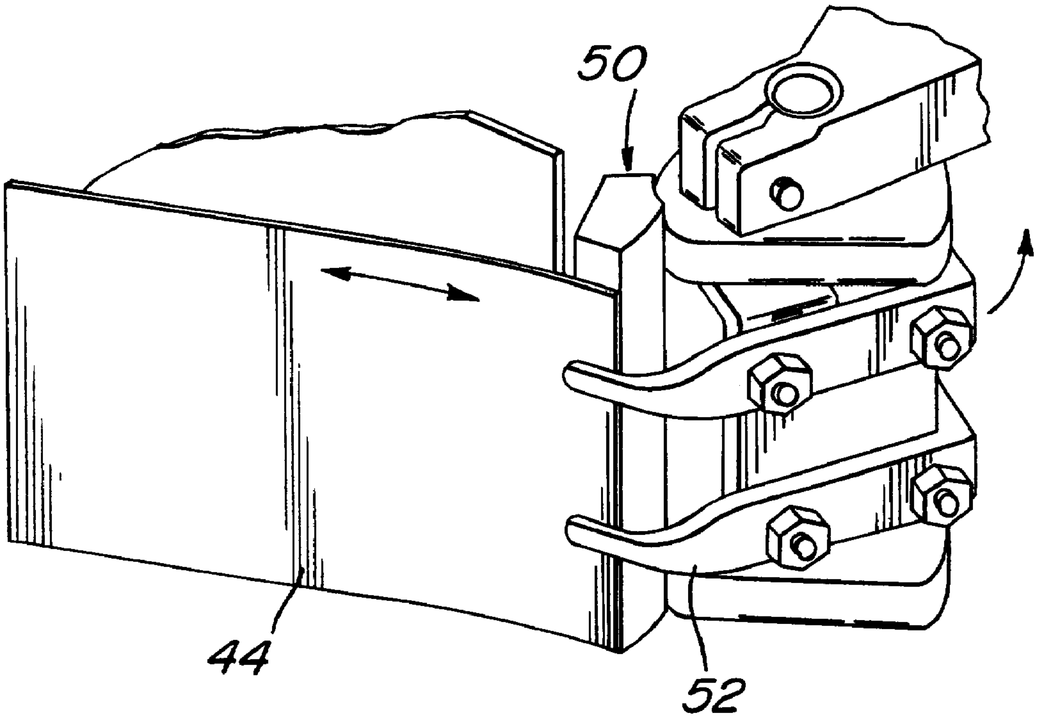
FIG. 4 is an enlarged, fragmentary isometric view illustrating, in schematic form, the retention of a label on a transfer assembly that directs the label through a UV cure station and then to the label application station.

Referring to FIGS. 1 and 4, the transfer pads 32, with the labels thereon, are then rotated by the support member 34 to a transfer assembly shown generally at 50. This transfer assembly includes a plurality of cam operated gripping members 52 disposed about the periphery thereof for engaging labels 44 carried by the transfer pads 32 and transferring the labels to the transfer assembly 50. The transfer assembly 50 is of a conventional design, and therefore the details of this assembly, including the cam operation of the gripping members 52 is omitted, for purposes of brevity. Suffice it to state that the gripping members 52 engage the labels 44 carried on the transfer pads 32 in the regions of the labels aligned with cut-outs 32A in the transfer pads 32, as is best illustrated in FIGS. 2 and 3. During transfer of the labels to the transfer assembly 50 the pads 32 are oscillated in the counterclockwise direction of arrow 35A, as viewed in FIG. 1.

Referring again to FIG. 1, the rotary transfer assembly 50, with labels 44 thereon, is directed through an irradiating section in the form of a UV cure section 54. The UV cure section includes an ultraviolet light source for exposing the adhesive on the labels 44 to UV radiation, thereby at least partially curing the adhesive to render the adhesive sufficiently tacky to permit the label to be securely and effectively adhered to the outer surface of a container; preferably a curved outer surface of a bottle. In an exemplary embodiment of the invention, the UV cure section 54 provides a power output in the range of about 200 to about 1200 watts per inch. The specific power output required depends, among other factors, upon the cure rate of the specific UV curable adhesive employed and the speed of operation of the labeling equipment. The degree of cure of the adhesive is most effectively controlled by controlling the total amount of radiation of appropriate wavelength that is delivered to the adhesive. The factors effecting the total amount of radiation of appropriate wavelength delivered to the adhesive are (1) residence time of the adhesive in the light, (2) wavelength match between the adhesive and the light source, (3) distance from the light source to the adhesive, (4) intensity of the light source and (5) use of filters, absorbers or attenuators.

In an exemplary embodiment, a 300 watt per inch output UV lamp provides sufficient intensity to cure the desired coating thickness in the range of 1 to 1.5 microns at film throughput speeds of up to about 150 feet per minute, as measured by Instron initial tack curves. This equates to a labeler speed of about 300 bottles per minute. It is believed that a 600 watt per inch output UV lamp will be effective on labeling apparatus running at labeling speeds in the range of 500 bottles per minute. Most preferably, a type "H" bulb is employed with the most preferred UV curable adhesive, as will be discussed in greater detail hereinafter.

It should be understood that in the preferred embodiments of this invention the UV curable adhesive is in a minimally tacky state (defined earlier) until it passes through the UV cure station 54. Thus, in accordance with this invention, the apparatus and method are employed without the need to handle an excessively tacky adhesive material throughout the entire processing operation. Stating this another way, the UV curable adhesive is only rendered sufficiently tacky to permit the label to be effectively adhered to the outer surface of a container at a location closely adjacent the label application station 24.

The preferred UV curable adhesives usable in this invention also are of a sufficiently low viscosity to permit the adhesive to be applied substantially uniformly over a label surface. Preferably, the viscosity of the adhesives usable in this invention is in the range of about 500 to about 10,000 centipoise; more preferably under 5,000 centipoise; still more preferably in the range of about 1,000 to about 4,000 centipoise and most preferably in the range of 2,000 to 3,000 centipoise.

UV curable adhesives are comprised of the free radical or cationic initiators and monomers which are polymerizable via these mechanisms. In accordance with the broadest aspects of this invention all of the above types of UV curable adhesives can be employed. UV curable adhesives are available form a variety of sources, e.g., H. B. Fuller, National Starch, Henkel, and Craig Adhesives & Coatings Company of Newark, N.J.

The most preferred UV curable adhesive employed in this invention, particularly when applying clear labels to containers, is an adhesive employing a combination of both free-radical and cationic initiators. Such an adhesive is available from Craig Adhesives & Coatings Company under the designation Craig C 1029 HYB UV pressure sensitive adhesive. This latter adhesive has a viscosity of approximately 2,500 centipoise. It should be noted that UV adhesives employing free-radical initiators have a strong initial cure but provide a poor visual appearance. On the other hand, UV adhesives employing cationic initiators provide weak initial cure but have good visual appearance. By employing a UV curable adhesive including a blend of these two types of initiators excellent results have been achieved.

Still referring to FIG. 1, each of the labels 44 is directed from the UV cure station 54 with the adhesive thereon being in at least a partially cured, sufficiently tacky condition to uniformly and effectively adhere the label to a container, and the label is then immediately rotated into a position for engaging the outer periphery of a bottle 20 carried on the turret 22 in the label application station 24. It should be noted that the spacing of the labels on the transfer assembly 50 and the speed of rotation of the transfer assembly are timed with the speed of rotation of the rotating turret 22 such that each label carried on the transfer assembly 50 is sequentially directed into engagement with an adjacent bottle carried on the rotating turret. Moreover, the photo detection system 43 prevents a label from being carried to the label application station 24 when a bottle for receiving such label is missing from that station.

Still referring to FIG. 1, each of the labels 44 is applied essentially at its midline to the periphery of an adjacent bottle 20, thereby providing outer wings extending in opposed directions from the center line of the label, which is adhered to the bottle. This manner of applying a label to a bottle is conventional and is employed in rotary labeling equipment, for example manufactured by Krones. However, in accordance with the broadest aspects of this invention, the labels can be applied to the outer surface of the bottles in other ways.

After a label 44 initially is adhered to a bottle 20 in the label application station 24, the rotating turret 22 directs each bottle, with the label attached thereto, through a series of opposed inner and outer brushes 56. As the bottles are directed through the series of brushes the bottles are also oscillated back and forth about their central axis to thereby create an interaction between the bottles, labels and brushes to effectively adhere the entire label to the periphery of each bottle. This brush arrangement and the system for oscillating the bottles as they move past the brushes are of a conventional design and are well known to those skilled in the art. Such a system is included in labeling equipment employing cold glue, for example labeling equipment manufactured by KRONES.

Still referring to FIG. 1, after the labels 44 have been effectively adhered to the bottles 20, the bottles are carried by the rotating turret 22 in the direction of arrow 58 to the bottle-transfer member 18, at which point the bottles are transferred to the outlet conveyor section 14 for subsequent packaging.

It should be understood that the UV curable adhesives that preferably are employed in this invention are in a minimally tacky, low viscosity state until they are exposed to UV radiation. Thus, as noted earlier herein, the apparatus and method of this invention are not required to handle an excessively tacky adhesive throughout the majority of the process. This provides for a cleaner running operation.

Moreover, UV curable adhesives are extremely well suited for use with clear labels since they are applied as a clear coating that does not detract from the clarity of the film. This permits clear films to be adhered to clear bottles to provide a highly attractive labeled product. Moreover, the most preferred UV curable adhesive, which is a blend of both free-radical and cationic initiators, exhibits cold flow after the label is applied to the container, to thereby fill in unsightly striations that are formed in the circumferential direction of the label, as well as other unsightly adhesive imperfections.

Without further elaboration, the foregoing will so filly illustrate our invention that others may, by applying current or future knowledge, readily adapt the same for use under various conditions of service.

What is claimed is:

1. A continuous method of applying individual, stacked plastic labels to containers including the sequential steps of:

maintaining a stack of individual plastic labels in a dispensing magazine;

applying a radiation curable adhesive to a transfer member, said adhesive being in a minimally tacky state;

causing said transfer member with the adhesive thereon to engage an exposed, lower surface of a lowermost label in the stack to apply said minimally tacky adhesive to said lower surface at a sufficient thickness to permit the adhesive to flow after the label is applied to a container to fill in visual defects in the adhesive between the label and the container, and also to remove the lowermost label from the stack and releasably adhesively secure said lowermost label to said transfer member for subsequent transport of the lowermost label through a radiation cure station;

directing the lowermost label with the radiation curable adhesive thereon through an irradiating station for irradiating the adhesive to render said minimally tacky radiation curable adhesive sufficiently tacky to effectively adhere said lowermost label to the container without preventing the adhesive from flowing between the label and the container to fill in visual defects in the adhesive, and thereafter;

effectively adhering the lowermost label to the outer surface of said container through the sufficiently tacky adhesive component while permitting the sufficiently tacky adhesive to flow and fill in visual defects in the adhesive between the label and the container.

2. The method of claim 1, wherein the radiation curable adhesive is applied uniformly over the surface of the label prior to directing the label through the cure station.

3. The method of claim 2, wherein the label is clear.

4. The method of claim 2, wherein the label is opaque.

5. The method of claim 2, wherein the label is a metallized film.

6. The method of claim 2, where the label is an oriented polypropylene film.

7. The method of claim 1, wherein the radiation curable adhesive is a clear adhesive after being irradiated and said adhesive is applied as a substantially continuous layer substantially uniformly over the surface of the plastic label prior to being irradiated, and wherein said label is effectively adhered to the container by adhering the label substantially continuously and uniformly to the outer surface of the container through the substantially continuous layer of the clear, irradiated, radiation curable adhesive.

8. The method of claim 7, wherein the plastic label is clear.

9. The method of claim 7, wherein the plastic label is opaque.

10. The method of claim 7, wherein the plastic label is a metallized film.

11. The method of claim 7, wherein the plastic label is an oriented polypropylene film.

12. The method of claim 1, including the step of sequentially applying the radiation curable adhesive to successive lowermost labels in the stack by successively engaging the lowermost surface of the successive lowermost labels in the stack with the transfer member including the radiation curable adhesive thereon.

13. The method of claim 12, wherein the transfer member includes a plurality of transfer pads that are carried on a rotating member, with each transfer pad being directed sequentially passed an adhesive application station at which the radiation curable adhesive is applied to an exposed surface of each pad and thereafter directing each pad into engagement with the lower surface of the lowermost label in the stack.

14. The method of claim 13, wherein the adhesive is applied to each of the pads through a gravure or anilox roll driven through a metering device to apply the adhesive onto the surface of the gravure or anilox roll for transfer to the exposed surface of each of the transfer pads.

15. The method of claim 1, wherein the step of applying the radiation curable adhesive to a surface of the label is carried out by applying a UV curable adhesive to said surface.

16. The method of claim 15, wherein the step of applying the UV curable adhesive is carried out by applying a UV curable adhesive that includes both free-radical initiators and cationic initiators.

17. The method of claim 15, wherein the UV curable adhesive is applied to the surface of the label in a weight of at least 6 pounds per ream.

18. The method of claim 17, wherein the plastic label is clear.

19. The method of claim 15, wherein the UV curable adhesive is applied to the surface of the label in a weight of greater than 6 pounds per ream.

20. The method of claim 19, wherein the plastic label is clear.

21. The method of claim 15, wherein the UV curable adhesive is applied to the surface of the label in a thickness of at least 1 mil.

22. The method of claim 21, wherein the plastic label is clear.

23. The method of claim 2, wherein the step of applying the radiation curable adhesive to a surface of the label is carried out by applying a UV curable adhesive to said surface.

24. The method of claim 3, wherein the step of applying the radiation curable adhesive to a surface of the label is carried out by applying a UV curable adhesive to said surface.

25. The method of claim 4, wherein the step of applying the radiation curable adhesive to a surface of the label is carried out by applying a UV curable adhesive to said surface.

26. The method of claim 5, wherein the step of applying the radiation curable adhesive to a surface of the label is carried out by applying a UV curable adhesive to said surface.

27. The method of claim 6, wherein the step of applying the radiation curable adhesive to a surface of the label is carried out by applying a UV curable adhesive to said surface.

28. The method of claim 7, wherein the step of applying the radiation curable adhesive to a surface of the label is carried out by applying a UV curable adhesive to said surface.

29. The method of claim 8, wherein the step of applying the radiation curable adhesive to a surface of the label is carried out by applying a UV curable adhesive to said surface.

30. The method of claim 9, wherein the step of applying the radiation curable adhesive to a surface of the label is carried out by applying a UV curable adhesive to said surface.

31. The method of claim 10, wherein the step of applying the radiation curable adhesive to a surface of the label is carried out by applying a UV curable adhesive to said surface.

32. The method of claim 11, wherein the step of applying the radiation curable adhesive to a surface of the label is carried out by applying a UV curable adhesive to said surface.

33. The method of claim 12, wherein the step of applying the radiation curable adhesive to a surface of the label is carried out by applying a UV curable adhesive to said surface.

34. The method of claim 13, wherein the step of applying the radiation curable adhesive to a surface of the label is carried out by applying a UV curable adhesive to said surface.

35. The method of claim 14, wherein the step of applying the radiation curable adhesive to a surface of the label is carried out by applying a UV curable adhesive to said surface.

36. The method of claim 1, wherein the step of applying a radiation curable adhesive to a transfer member is carried out by applying a UV curable adhesive having a viscosity in the range of about 500 to about 10,000 centipoise.

37. The method of claim 36, wherein the UV curable adhesive has a viscosity under 5,000 centipoise.

38. The method of claim 37, wherein the UV curable adhesive has a viscosity in the range of about 1,000 to about 4,000 centipoise.

39. The method of claim 38, wherein the UV curable adhesive has a viscosity in the range of 2,000 to 3,000 centipoise.

* * * * *